(12) United States Patent
Spirig et al.

(10) Patent No.: US 6,895,844 B2
(45) Date of Patent: May 24, 2005

(54) LASER-BASED CALIBRATING METHOD AND APPARATUS

(75) Inventors: Walter Spirig, Pointe-Claire (CA); Young Chul Shin, Verdun (CA)

(73) Assignee: Cemar Electro Inc., Dorval (CA)

( * ) Notice: Subject to any disclaimer, the term of this patent is extended or adjusted under 35 U.S.C. 154(b) by 138 days.

(21) Appl. No.: 10/267,646

(22) Filed: Oct. 10, 2002

(65) Prior Publication Data

US 2004/0069101 A1 Apr. 15, 2004

(51) Int. Cl.[7] .................... B27B 13/16; B26D 7/01
(52) U.S. Cl. .................... 83/36; 83/75.5; 83/76.8; 83/520; 144/356; 144/394; 144/404
(58) Field of Search ................... 83/34, 35, 36, 83/75.5, 76.8, 520; 144/394, 404

(56) References Cited

U.S. PATENT DOCUMENTS

| | | | | |
|---|---|---|---|---|
| 4,458,567 A | * | 7/1984 | Tuomaala | 83/13 |
| 4,879,659 A | * | 11/1989 | Bowlin et al. | 700/167 |
| 4,926,917 A | * | 5/1990 | Kirbach | 144/356 |
| 4,941,100 A | * | 7/1990 | McFarlane et al. | 700/167 |
| 4,947,909 A | * | 8/1990 | Stroud | 144/357 |
| 5,435,361 A | * | 7/1995 | Knerr | 144/378 |
| 5,538,056 A | * | 7/1996 | Thoma | 144/342 |
| 5,544,558 A | * | 8/1996 | Hughes | 83/75.5 |
| 5,784,941 A | | 7/1998 | Sanborn | |
| 5,806,401 A | | 9/1998 | Rajala et al. | |
| 5,819,626 A | | 10/1998 | Lucas | |
| 6,105,477 A | | 8/2000 | Olson | |
| 6,337,920 B1 | * | 1/2002 | Muhlhoff | 382/128 |
| 6,520,228 B1 | * | 2/2003 | Hannebauer et al. | 144/398 |
| 2001/0049988 A1 | * | 12/2001 | Ushiwata et al. | 83/520 |

* cited by examiner

Primary Examiner—Charles Goodman
(74) Attorney, Agent, or Firm—Ogilvy Renault

(57) ABSTRACT

A method and apparatus for identifying a place where a saw may be performed. An oscillating laser beam is provided to a target according to a user preference. The user selects at least one characteristic of the oscillating laser beam in order to identify the target in an outdoor environment. The selected at least one characteristic is then provided to a motor which executes the oscillating.

25 Claims, 7 Drawing Sheets

_US 6,895,844 B2_

LASER-BASED CALIBRATING METHOD AND APPARATUS

CROSS-REFERENCE TO RELATED APPLICATIONS

This is the first application filed for the present invention.

TECHNICAL FIELD

This invention relates to the field of sawmills. More precisely, this invention relates to the adjusting of a cut in a sawmill.

BACKGROUND OF THE INVENTION

It is highly desirable for a timberland owner to manufacture himself his own lumber products. A large number of portable sawmills is now available on the market, with prices ranging from a few thousand dollars to a hundred thousand dollars depending on various parameters.

In order to saw lumber commercially, it is important to perform a precise cut on a log. Such precise cut on the log is performed by precisely select a place on the log where the cut will be performed.

Lasers have been used in some embodiments for selecting a place of the log where the cut must be performed. Unfortunately, it is not easy to precisely locate a laser beam in an outdoor environment such as when a portable saw is used.

Two types of apparatus are commonly found in laser-based calibrating apparatus. A first type of apparatus relates to a laser which provides a single laser line on the log, while the second type of apparatus relates to a laser which provides a point on the log where the saw must be performed.

Unfortunately, the two apparatus still suffer from a non-easy location of the laser.

As someone skilled in the art will note, a non-easy location of the laser beam slow as a consequence a cutting process, decreasing therefore the efficiency of the sawmill. Furthermore, as a further consequence, such drawback may be a source of error when a saw is performed.

It is an object of the invention to provide a method and apparatus which overcome the above-mentioned drawbacks.

SUMMARY OF THE INVENTION

It is an object of the invention to provide a method for locating a place, using a laser, where a cut may be performed.

It is another object of the invention to provide an apparatus for locating a place where a cut may be performed using a laser.

According to a first aspect of the invention, there is provided an apparatus for providing a visual indication of a location of an object using a laser beam provided by a laser, the apparatus comprising a laser source providing a laser spot beam, a user selecting unit providing a selected laser beam controlling scheme signal according to a chosen vicinity of a location of interest on an object, the selected laser beam controlling scheme signal enabling a moving of the laser spot beam provided by the laser source in the chosen vicinity of the location of interest of the object and a positioning unit, positioning the laser spot beam using the selected laser beam controlling scheme signal; wherein the positioning of the laser spot beam according to the selected controlling scheme signal enables a precise visual indication of a location on the object using the laser spot beam.

According to another aspect of the invention, there is provided a method for sawing a log, the method comprising the steps of providing an oscillating laser spot beam on a selected cut line on a log to saw in alignment with a saw blade, selecting a cut line on the log to saw guided by said oscillating laser spot beam and performing a cut with said saw blade in accordance with the provided oscillating laser spot beam on the selected cut line on the log to saw.

According to another aspect of the invention, there is provided an apparatus for sawing a log at a region of interest on the log, the apparatus comprising a rotating laser spot beam providing apparatus comprising a laser and providing an oscillating laser spot beam defining a plane on a region of interest of the log and a saw adjustable with respect to the plane defined by the oscillating laser spot beam for sawing the log, wherein the adjustable saw performs a sawing of the log at the region of interest using the rotating laser spot beam.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
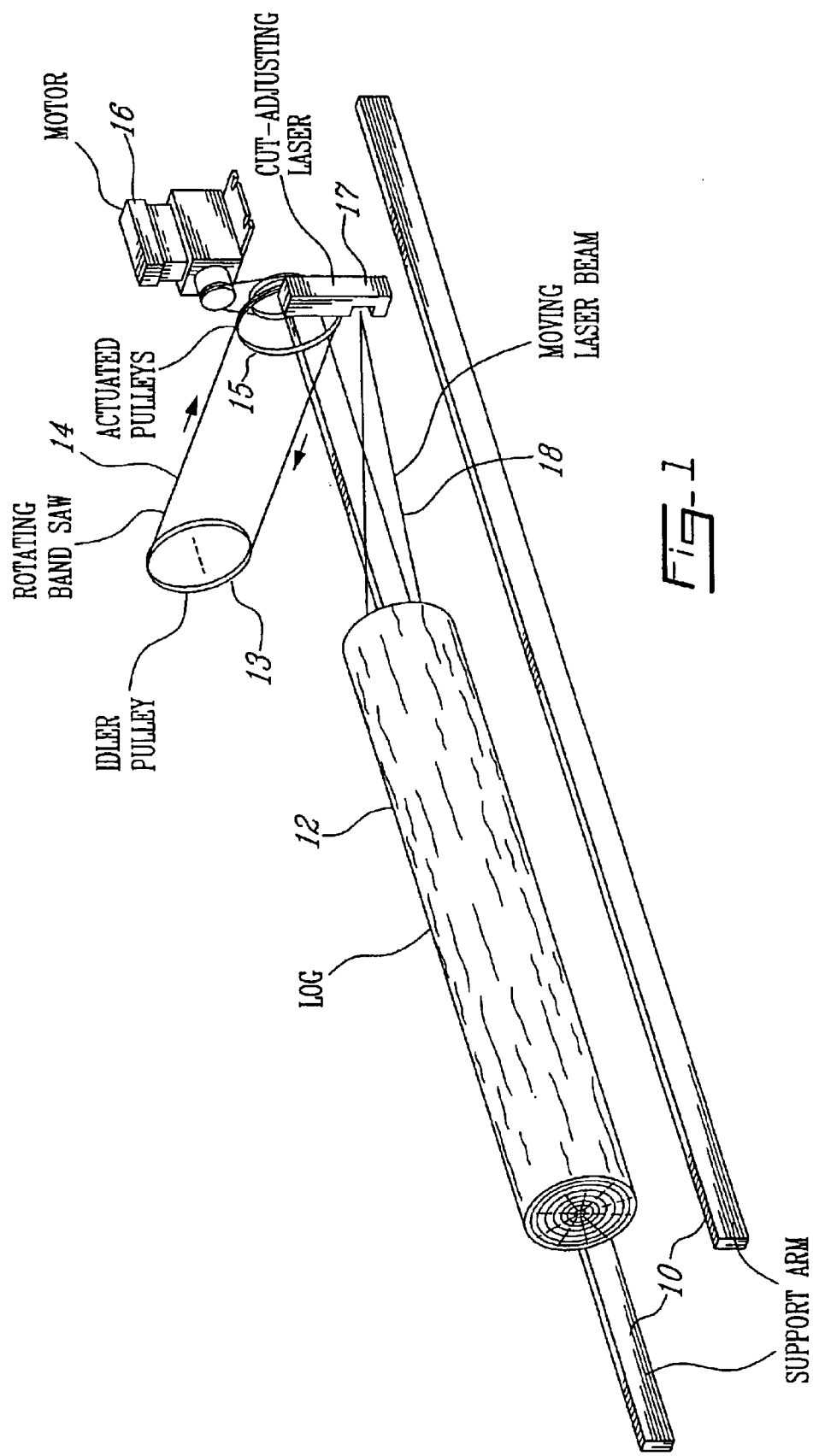
FIG. 1 is a perspective view of the preferred embodiment of the invention.

Now referring to FIG. 1, there is shown a preferred embodiment of the invention.

The portable sawmill comprises at least two support arms 10, a log 12, a rotating band saw 14 located between an idler pulley 13 and an actuated pulley 15, a motor 16 and a cut-adjusting laser 17.

The log 12 is supported by the support arms 10 and is directed towards the rotating band saw 14.

The rotating band saw 14 is located between the idler pulley 13 and the actuated pulley 15.

The actuated pulley 15 is actuated by a motor 16.

The cut-adjusting laser 17 enables a user to select a place where the log is to be cut by the rotating band saw 14. More precisely, the cut-adjusting laser 17 provides a moving laser beam 18 on the log 12.

Height of the rotating band saw 14 is adjusted according to a place selected by the user using the laser beam provided by the cut adjusting laser 17.

Figure 2:
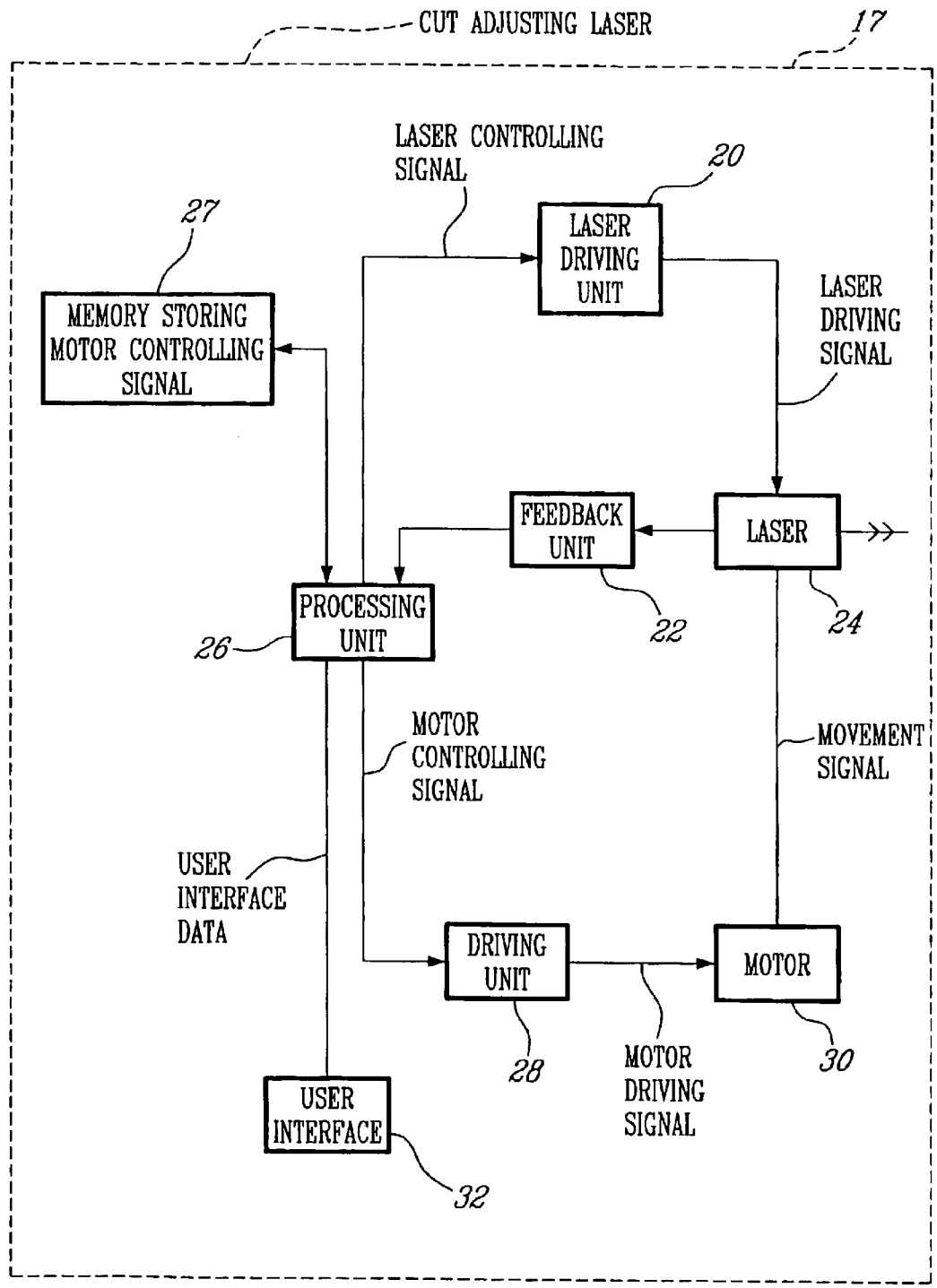
FIG. 2 is a block diagram of a cut adjusting laser in the preferred embodiment of the invention; the cut adjusting laser comprises a processing unit, a laser, a motor and a user interface.

Now referring to FIG. 2, there is shown a block diagram of the cut-adjusting laser 17 according to the preferred embodiment of the invention.

According to the preferred embodiment of the invention, the cut-adjusting laser 17 comprises a laser driving unit 20, a feedback unit 22, a laser 24, a processing unit 26, a memory 27 storing a processed motor controlling scheme, a motor driving unit 28, a motor 30 and a user interface 32.

The laser 24 comprises a lens for focusing a laser beam.

The processing unit 26 provides a laser controlling signal to the laser driving unit 20. In the preferred embodiment of the invention, the laser controlling signal comprises a ON/OFF signal controlling the operating to the laser 24. Still in the preferred embodiment, the laser controlling signal comprises an intensity signal for modifying laser beam intensity.

The processing unit 26 provides a motor controlling signal to the motor driving unit 28. In the preferred embodiment of the invention, the motor driving unit 28 is a H-Bridge and the motor controlling signal is a Pulse Width Modulation (PWM) signal. Alternatively various other types of signal modulation, motor driving unit 28 and motor controlling signal may be used in accordance with a motor type.

The memory 27 stores a motor controlling signal and is connected to the processing unit 26. Upon power up, the motor controlling signal stored in the memory 27 may be provided to the driving unit 28.

The driving unit 28 provides a motor driving signal to the motor 30. Still in the preferred embodiment, the motor 30 is a stepper motor.

Figure 6:
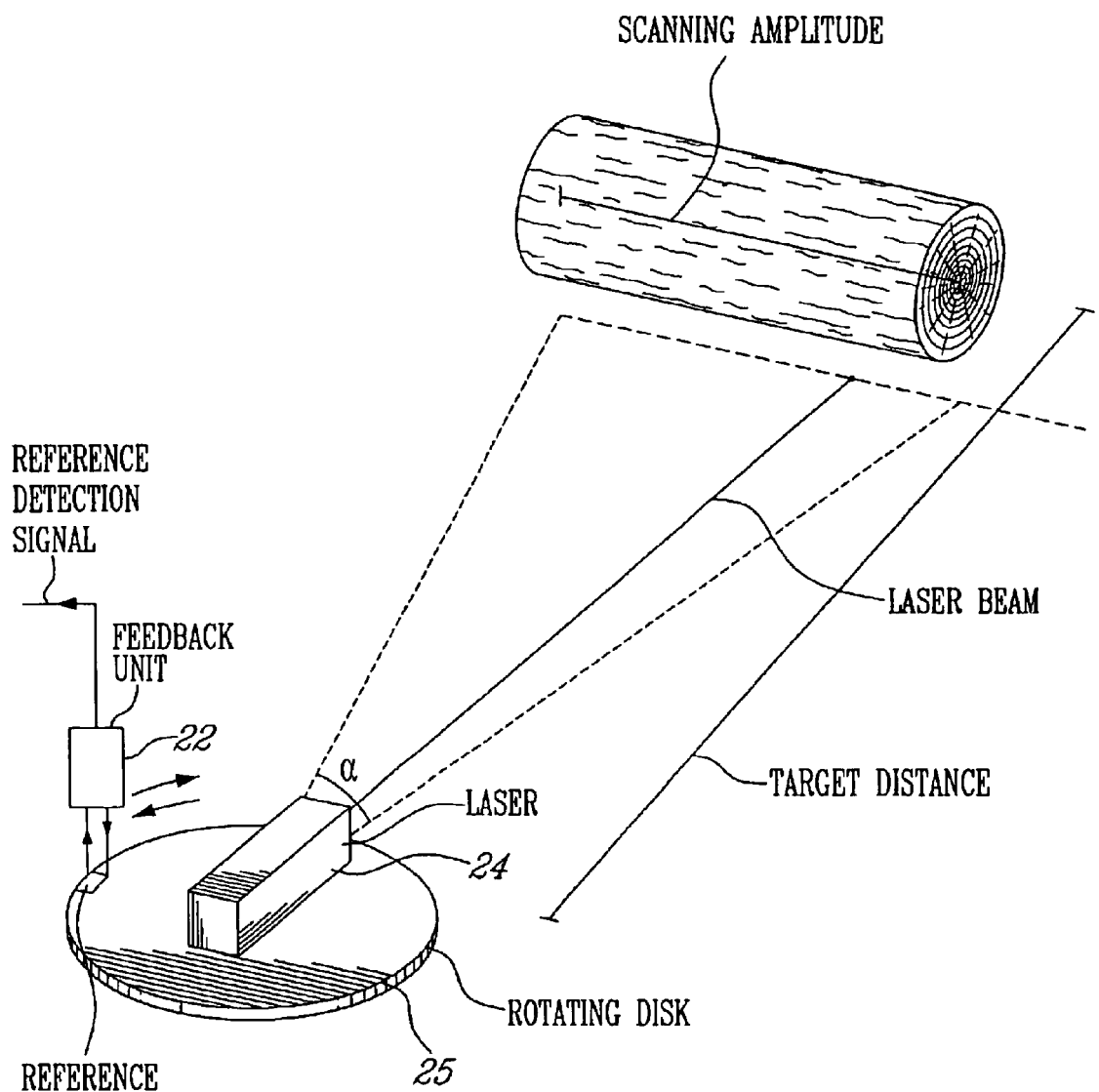
FIG. 6 is a perspective view of an alternative embodiment of the cut adjusting laser.

In one embodiment of the invention, and as shown in FIG. 6, the laser 24 is seated on an horizontal rotating disk actuated by the motor 30 according to the motor driving signal provided by the driving unit 28.

Figure 5:
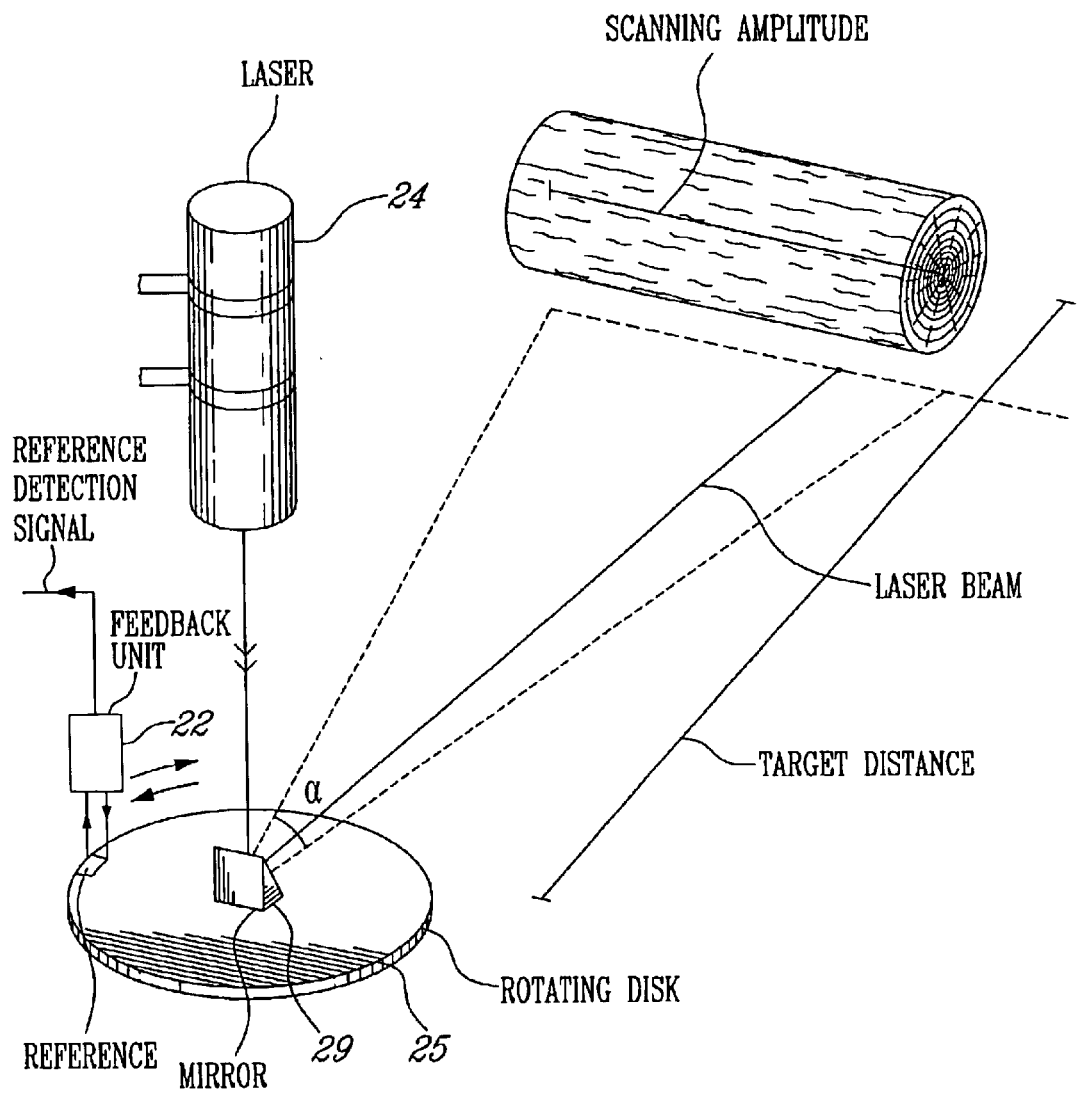
FIG. 5 is a perspective view of the preferred embodiment of the cut adjusting laser.

As shown in FIG. 5 and in the preferred embodiment of the invention, the laser 24 is located above a rotating disk 25 and the laser beam is pointing vertically the center of the rotating disk 25 located below the laser 24, where a mirror 29 is located. As the rotating disk 25 rotates, a rotating laser beam is created by a reflection of an incoming laser beam provided by the laser 24 on the mirror 29.

A gearbox is advantageously used in order for the motor 24 to actuate the rotating disk 25.

The feedback unit 22 provides information with respect to a reference located on the rotating disk 25 to the processing unit 26. The feedback unit 22 comprises a photo sensor, which may detect a reference and then provide a reference detection signal to the processing unit 26, indicative of said detection. More precisely, and in the preferred embodiment of the invention, the reference is located on the rotating disk and the feedback unit 22 provides the reference detection signal to the processing unit 26 when the reference is detected by the photo sensor.

Alternatively, a limit switch may be used instead of the photo sensor or any other sensors. In another embodiment of the invention, no feedback unit 22 is used for providing a reference detection signal to the processing unit 26. The user interface 32 may also comprise a push button which enables the providing of a signal for actuating the driving unit 28 to drive the motor 30 until it reaches a start position. In another embodiment, the push button drives the motor 30 to a fixed position.

A user provides as explained below a user interface data via the user interface 32.

Figure 3:
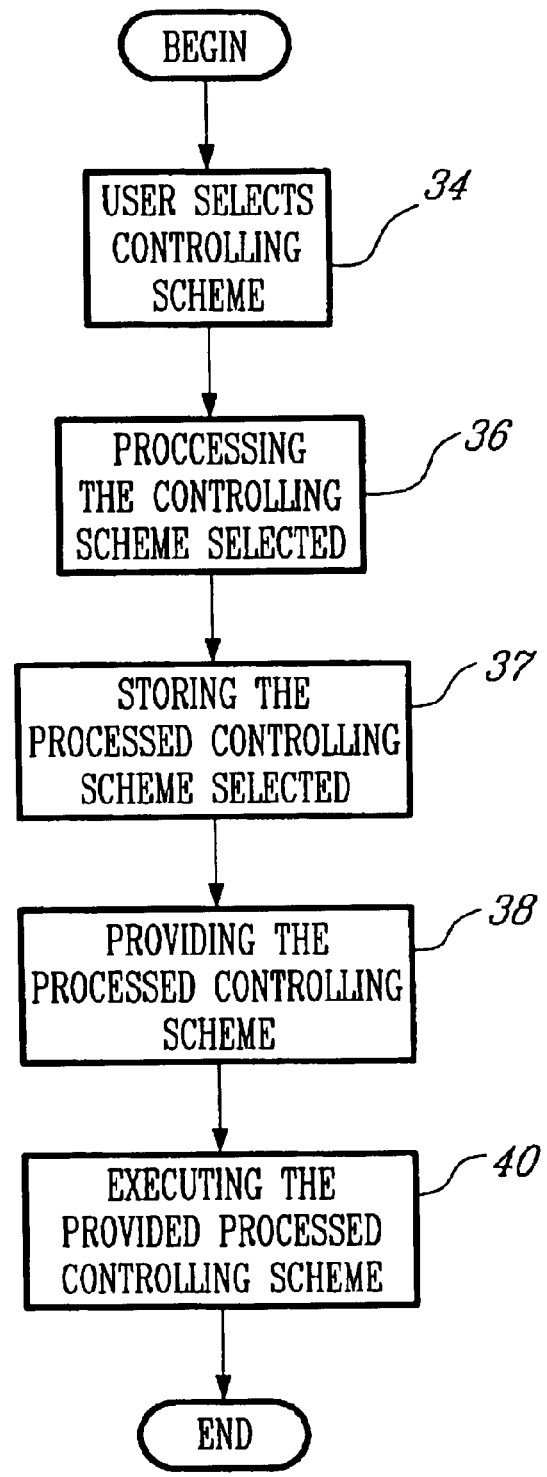
FIG. 3 is a flow chart which shows steps performed according to the preferred embodiment of the invention.

Now referring to FIG. 3, there is shown how the cut adjusting laser 17 operates.

According to step 34, the user selects a controlling scheme.

Figure 4:
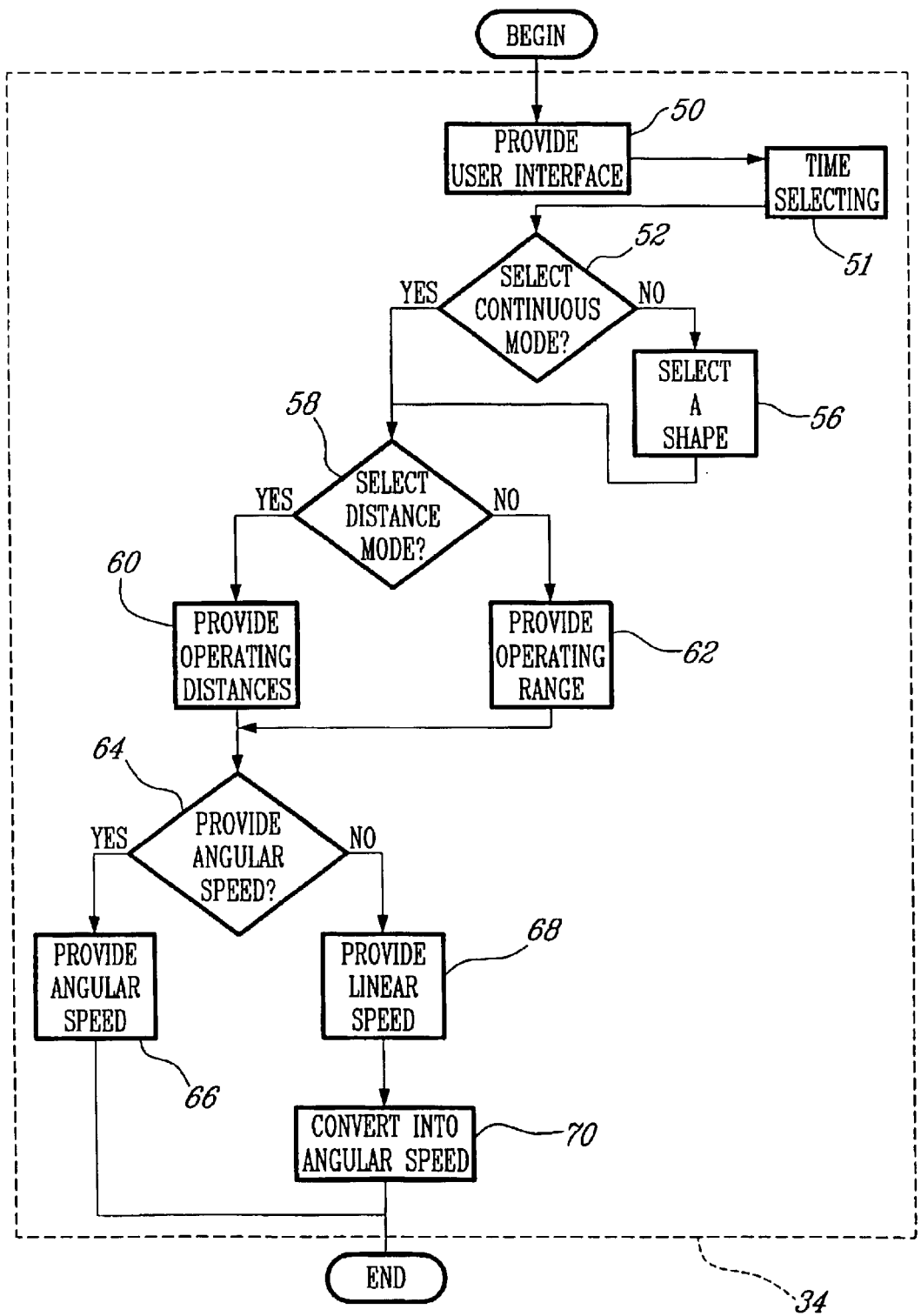
FIG. 4 is a flow chart which shows how a user controls the cut adjusting laser using the user interface according to the preferred embodiment of the invention.

Now referring to FIG. 4, there is shown how a user selects a controlling scheme.

According to step 50, a user interface 32 is provided to the user. In one embodiment, the user interface 32 comprises a screen with a keyboard. In an alternative embodiment, the user interface 32 is a touchscreen display. In another alternative embodiment, the user interface comprises a plurality of predetermined function keys.

According to step 51, an operating time is selected by the user. According to step 52, the user selects between a continuous mode and a non-continuous mode. The continuous mode refers to a mode where the laser beam has a continuous power emitting intensity, while the non-continuous mode refers to a mode where the laser beam has a non-continuous power emitting intensity.

If the non-continuous mode is selected and according to step 56, the user selects a shape for the laser beam. The shape may be any ones of a sine shape, cosine shape, triangular shape, a square shape, etc. The shape selected relates to a variation of the laser beam power emitting intensity with time.

According to step 58, the user selects between a distance mode and a angle mode.

If the user selects the distance mode and according to step 60, the user provides operating distances using the user interface. The operating distances comprises a distance to the target as well as a scanning amplitude. Now referring to FIG. 5, there are shown the target distance and the scanning amplitude. In fact, in the preferred embodiment, the target distance is defined as a distance between the mirror and the target to identify, which is the log 12. The scanning amplitude is defined as a distance between which the laser beam may oscillate.

If the user selects the angle mode and according to step 62, the user selects an operating angle α. The operating angle is defined by the angle created by two extreme laser beams of an oscillating laser beam.

According to step 64, the user selects between a providing of a linear speed or a providing of an angular speed.

According to step 66, the user provides an angular speed using the user interface 32.

According to step 68, the user provides a linear speed using the user interface 32.

It will be appreciated that FIG. 4 is an example of an implementation of the invention, the user interface 32 may enable the user to access directly one or another step of FIG. 4.

Now referring back to FIG. 3 and according to step 36, the controlling scheme provided according to step 34, using the user interface 32, is processed using the processing unit 26. In the preferred embodiment of the invention, the processing comprises the converting of data provided to create the motor controlling signal which comprises a speed signal, an angle signal and a direction signal for driving the motor.

According to step 37, the motor controlling signal is stored in the memory 27.

According to step 38, the motor controlling signal is provided to the driving unit 28.

According to step 40, the driving unit 28 provides a motor driving signal to the motor 30 in accordance with the controlling scheme selected by the user via the user interface 32.

A moving laser beam according to the present invention provides therefore a solution in outdoor lighting situation.

In the preferred embodiment of the invention and at power up of the cut adjusting laser 17, a rotation of the rotating disk 25 is performed until the photo sensor detects the reference in order to calibrate the cut adjusting laser 17.

In the preferred embodiment, a watchdog device, not shown in the figures, is connected to the processing unit. The watchdog device detects abnormal operations such as a power surge for instance. For instance, in case of a power surge, the cut adjusting laser 17 may be shut down in order to protect at least the motor 30.

Figure 7:
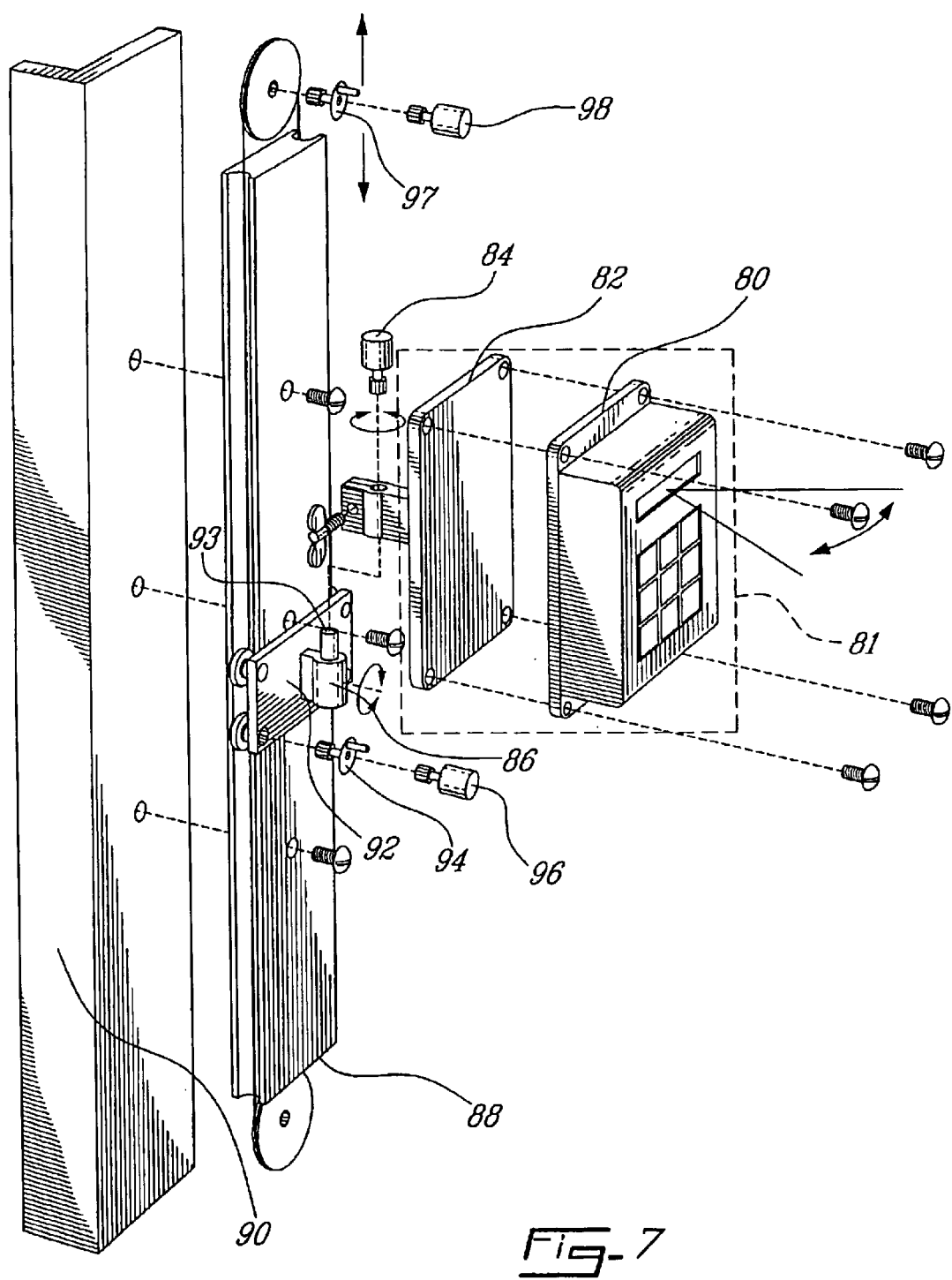
FIG. 7 is an exploded view of a cut adjusting laser which is located in a removable unit.

Still in the preferred embodiment of the invention, and as shown in FIG. 7, the cut adjusting laser 17 is embedded in a casing 81 which may be removed from the portable sawmill in order to at least protect fragile components from vandalizing. In one embodiment of the invention, a laser module casing 80 is mounted over a mounting plate 82. The mounting plate 82 may be placed on a height adjusting handle 92. The height adjusting handle 92 may be rotated over rotating axis 93. The rotation over the rotating axis 93 may be performed manually or using a motor 84. The height adjusting handle 92 may be used to translated on a sliding rail 88 using a manual rotating handle 93 or a motor 97. The sliding rail 88 is fixed on a saw mill machine structure 90.

In an alternative embodiment, the height adjusting handle 92 may be translated on a female-type sliding rail.

Still in the preferred embodiment, the laser driving unit 20 may provide a laser driving signal which puts the laser into a power saving mode if the cut adjusting laser 17 is in idle mode by setting the operating time for a predefined period.

The embodiment of the invention described above is intended to be exemplary only. The scope of the invention is therefore intended to be limited solely by the scope of the appended claims.

We claim:

1. A method for sawing a log, the method comprising the steps of:
   providing an oscillating laser spot beam on a selected cut line on a log to saw in alignment with a saw blade;
   selecting a cut line on the log to saw guided by said oscillating laser spot beam;
   performing a cut with said saw blade in accordance with the provided oscillating laser spot beam on the selected cut line on the log to saw.

2. The method as claimed in claim 1, wherein the log to saw is exposed in direct sunshine.

3. The method as claimed in claim 1, further comprising the step of selecting an oscillating pattern for said oscillating laser spot beam, the selecting comprising the selecting of an oscillating speed.

4. The method as claimed in claim 3, further comprising the step of modifying an intensity of the oscillating laser spot beam during time in accordance with an oscillating function.

5. An apparatus for providing a visual indication of a location on an object using a laser beam provided by a laser, the apparatus comprising:
   a laser source providing a laser spot beam;
   a user selecting unit providing a selected laser beam controlling scheme signal according to a chosen vicinity of a location of interest on said object, the selected laser beam controlling scheme signal enabling a moving of the laser spot beam provided by the laser source in the chosen vicinity of the location of interest of the object;
   a positioning unit, positioning the laser spot beam using the selected laser beam controlling scheme signal;
   wherein the positioning of the laser spot beam according to the selected controlling scheme signal enables a precise visual indication of a location on the object using the laser spot beam.

6. The apparatus as claimed in claim 5, wherein the positioning unit comprises a rotating disk, actuated by a motor according to the selected laser beam controlling scheme signal, the laser source providing the laser spot beam being seated substantially radially on said rotating disk.

7. The apparatus as claimed in claim 5, wherein the positioning unit comprises a rotating disk, actuated by a motor according to the selected laser beam controlling scheme signal; the positioning unit further comprising a reflecting unit located substantially on a center of the rotating disk, the reflecting unit reflecting the laser spot beam provided by said laser source to provide the positioned laser spot beam.

8. The apparatus as claimed in claim 6, wherein said rotating disk is actuated by said motor using a gearbox.

9. The apparatus as claimed in claim 7, wherein said rotating disk is actuated by said motor using a gearbox.

10. The apparatus as claimed in claim 5, wherein the user selecting unit comprises a user interface further receiving from a user a selected laser driving scheme, the user interface providing the selected laser driving scheme to a processing unit; the processing unit processing the laser driving scheme and the chosen vicinity of a location of interest on the object to provide the selected laser beam controlling scheme signal.

11. The apparatus as claimed in claim 10, further comprising a memory connected to said processing unit, storing the selected laser beam controlling scheme signal.

12. The apparatus as claimed in claim 10, wherein the selected laser driving scheme comprises an intensity time-variable laser beam signal.

13. The apparatus as claimed in claim 12, wherein the intensity time-variable laser beam signal fluctuates as a sine-wave.

14. The apparatus as claimed in claim 12, wherein the intensity time-variable laser beam signal fluctuates as a square-wave.

15. The apparatus as claimed in claim 6, further comprising a motor driving unit receiving the laser driving control signal and providing a motor driving signal, further wherein said motor is a stepper motor receiving said motor driving signal.

16. The apparatus as claimed in claim 15, wherein said motor driving unit is a H-Bridge.

17. The apparatus as claimed in claim 7, further comprising a motor driving unit receiving the laser driving control signal and providing a motor driving signal, further wherein said motor is a stepper motor receiving said motor driving signal.

18. The apparatus as claimed in claim 17, wherein said motor driving unit is a H-bridge.

19. An apparatus for sawing a log at a region of interest on the log, the apparatus comprising a:
   a rotating laser spot beam providing apparatus comprising a laser and providing an oscillating laser spot beam defining a plane on a region of interest of the log;
   a saw adjustable with respect to the plane defined by the oscillating laser spot beam for sawing the log;
   wherein the adjustable saw performs a sawing of the log at the region of interest using the rotating laser spot beam.

20. The apparatus as claimed in claim 19, wherein the rotating laser spot beam providing apparatus comprises a rotating disk, actuated by a motor, the laser providing the laser spot beam being seated substantially radially on said rotating disk and providing the oscillating laser spot beam.

21. The apparatus as claimed in claim 19, wherein the rotating laser spot beam apparatus comprises a rotating disk, actuated by a motor; the rotating laser apparatus further comprising a reflecting unit located substantially on a center of the rotating disk, the reflecting unit reflecting the laser spot beam to provide the oscillating laser spot beam.

22. The apparatus as claimed in claim 21, further wherein said rotating disk is actuated by said motor using a gearbox.

23. The apparatus as claimed in claim 21, further wherein said rotating disk is actuated by said motor using a gearbox.

24. The apparatus as claimed in claim 19, wherein said rotating laser spot beam providing apparatus is removable from said apparatus for sawing a log.

25. The apparatus as claimed in claim 21, wherein the rotating laser spot beam providing apparatus, providing the oscillating laser spot beam, further comprises a user interface receiving a user input data, the rotating laser spot beam providing apparatus further comprising a processing unit processing the user input data controlling said motor to provide the oscillating laser spot beam.

\* \* \* \* \*